United States Patent [19]

Cournoyer et al.

[11] Patent Number: 4,913,296
[45] Date of Patent: Apr. 3, 1990

[54] STORING AND DISPENSING SYSTEM

[75] Inventors: Bernard T. Cournoyer, Holden; Frederick J. Moriarty, Worcester, both of Mass.

[73] Assignee: Applied Power Inc., Milwaukee, Wis.

[21] Appl. No.: 175,114

[22] Filed: Mar. 30, 1988

[51] Int. Cl.⁴ .............................................. A47B 81/06
[52] U.S. Cl. ...................................... 211/41; 312/13; 312/15
[58] Field of Search ................... 211/41, 40, 59.2, 126, 211/133; 206/394; 312/9–15

[56] References Cited

U.S. PATENT DOCUMENTS

| | | | |
|---|---|---|---|
| 4,600,107 | 7/1986 | Price et al. | 211/41 |
| 4,619,368 | 10/1986 | Kappelt, Jr. | 211/41 |
| 4,630,737 | 12/1986 | King | 211/40 |
| 4,651,882 | 3/1987 | Wright et al. | 211/40 |
| 4,668,027 | 5/1987 | King et al. | 312/13 |

Primary Examiner—Blair M. Johnson

[57] ABSTRACT

A storing and dispensing system for substantially rectangular objects having a tray (12) with a plurality of side-by-side cells (40). Each cell has a bottom (30) that terminates at a location (41) spaced from a rear guide (32) to create a supporting surface (42) and a gap (44) contiguous with the rear guide of the cell to permit an object in the cell to be tilted into the gap to gain better access to an object in an adjacent cell.

12 Claims, 6 Drawing Sheets

STORING AND DISPENSING SYSTEM

FIELD OF THE INVENTION

This invention relates to storing and dispensing systems in general, and more specifically, to a system for storing and dispensing substantially rectangular objects such as magnetic tape cartridges, microfilm reels, video cassettes and the like.

BACKGROUND OF THE INVENTION

With the development of the IBM-3480 Magnetic Tape Subsystem, the heretofore popular 10½ inch reels of ferric oxide tape are being replaced with smaller and more efficient cassettes of magnetic tapes. Still, storage space for magnetic tapes is at a premium in libraries containing oftentimes hundreds of thousands of tapes. There is also the need for retrieving the tapes for use in computers.

A considerble body of art has developed directed to storing and dispensing systems for this type of object.

For example, U.S. Pat. No. 4,630,737 to Ronald R. King, discloses a system comprising pivotal cells for storing objects of this type. Another pivotal system is disclosed in the U.S. Pat. No. 4,668,027 to Ronald R. King and Norman C. May, Sr. These patents describe the IBM-3480 Magnetic Tape Subsystem in more detail and are incorporated herein by reference.

While these patents disclosed storing systems which were adaptable to library stacks wherein cells are arranged one above another in side-by-side relationship in racks or stacks, yet another U.S. Pat. No. 4,684,027 to David M. Wright disclosed a stationary storing and dispensing which is not only adaptablle for desk or countertop storing of objects but could be placed in a drawer or was acceptable in library stacks.

All of the above identified patents are commonly owned by Applicant's Assignee, Wright Line, Inc. of Worcester, MA.

An object of the invention is to provide a two-part storing and dispensing system where a plurality of substantially rectangular objects such as IBM-3480 cartridge are supported in trays which are removable from supporting means which are permanent, built-in library stacks.

It is yet another object of this invention to provide a storing and dispensing mechanism which while removable, has no moving parts, per se, as for example, those devices which employ tiltable cells.

It is intended that the present storing and dispensing system is also adaptable for use in library stacks where many rows of support means are arranged in side-by-side relationship, one above another.

SUMMARY OF THE INVENTION

The invention is embodied in a storing and dispensing system for substantially rectangular objects, as for example, magnetic tape cartridges. The objects are stored in a tray which has a front portion, a rear guide having an arcuate guiding surface and a bottom with dividers projecting upwardly from the bottom to form a plurality of individual holding cells. The bottom of the tray extends rearwardly from the front portion and terminates at a location which is spaced from the rear guide so as to create a supporting surface contiguous with the front portion and a gap in the bottom which is contiguous with the rear guide of the tray and hence of each cell.

Thus, an object which is normally stored on the supporting surface of each cell may be tilted into the gap to gain better access to an object in an adjacent cell. Two or more trays are supported, one above another, in parallel relationship in library stacks.

The support means comprise horizontally extending channels beneath each tray, each being substantially U-shaped, upwardly facing channel members which are arranged one above another either in the library stack or in the mobile cart. A tray is releasably secured to each support means, as for example, by spring-clip members which engage flared flanges of the U-shaped channel.

The terminal location of the bottom of the tray is closer to the rear guide than it is to the front portion of the cell thereby to make the supporting surface longer than the gap to give adequate support to the cartridges in the trays cells. The front of each tray may include means for attachment of identifying indicia to indicate the contents of each cell which would compliment corresponding indicia on each cartridge. The cells have means on the supporting surface, which normally would be planar, to compensate irregularities in the objects that engage the supporting surface.

The above and other features of the invention including various and novel details of construction and combinations of parts will now be more particularly described with reference to the accompanying drawings and pointed out in the claims. It will be understood that the particular storing and dispensing system embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
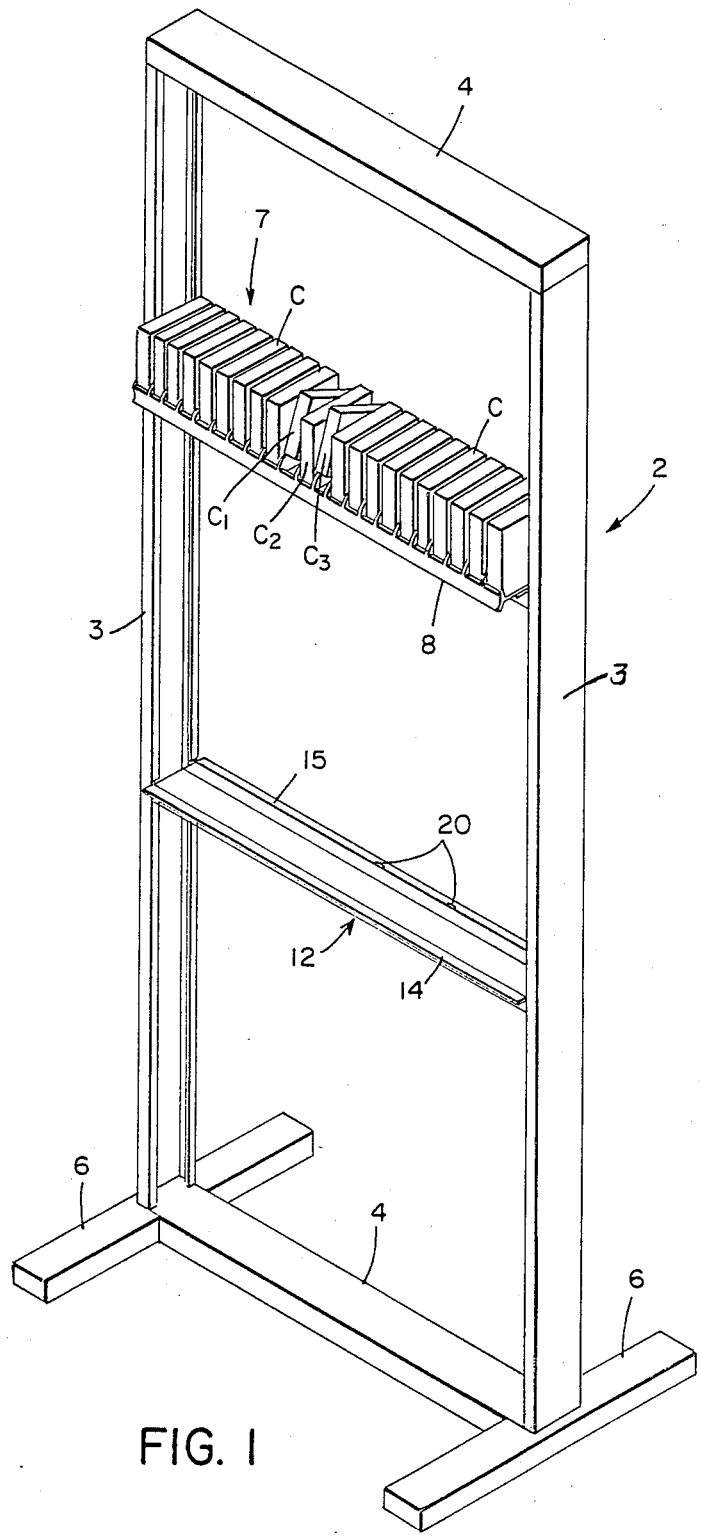
FIG. 1 is a perspective, schematic view of a portion of a library stack for storing and dispensing rectangular objects such as magnetic tape cartridges.

A schematic representation of a portion of a library stack will be seen in FIG. 1. It includes a frame 2 which has upright members 3, horizontal members 4 and supporting feet 6. The frame 2 is illustrative of not only a library stack, but also of the frame of any free standing supporting member. It also represents the frame portion of a mobile cart which may be employed for storing, transporting and dispensing rectangular objects such as magnetic tape cartridges from a library to data processing equipment which will utilize the cartridges.

The invention is not restricted to magnetic tape cartridges, per se, but may be employed for the storing and dispensing of other substantially rectangular objects such as VCR tapes, as for example in video cassette rental stores.

Cartridges C are located adjacent one another in horizontal rows 7, however, only one row of cartridge is shown in FIG. 1. The cartridges are stored in trays 8 which in turn are removably mounted on support means 12 (only one of which is shown in FIG. 1). It will be appreciated that there are a plurality of parallel support means 12 extending heightwise of the upright members 3, and thus, there are an equivalent number of removable trays 8.

Figure 5:
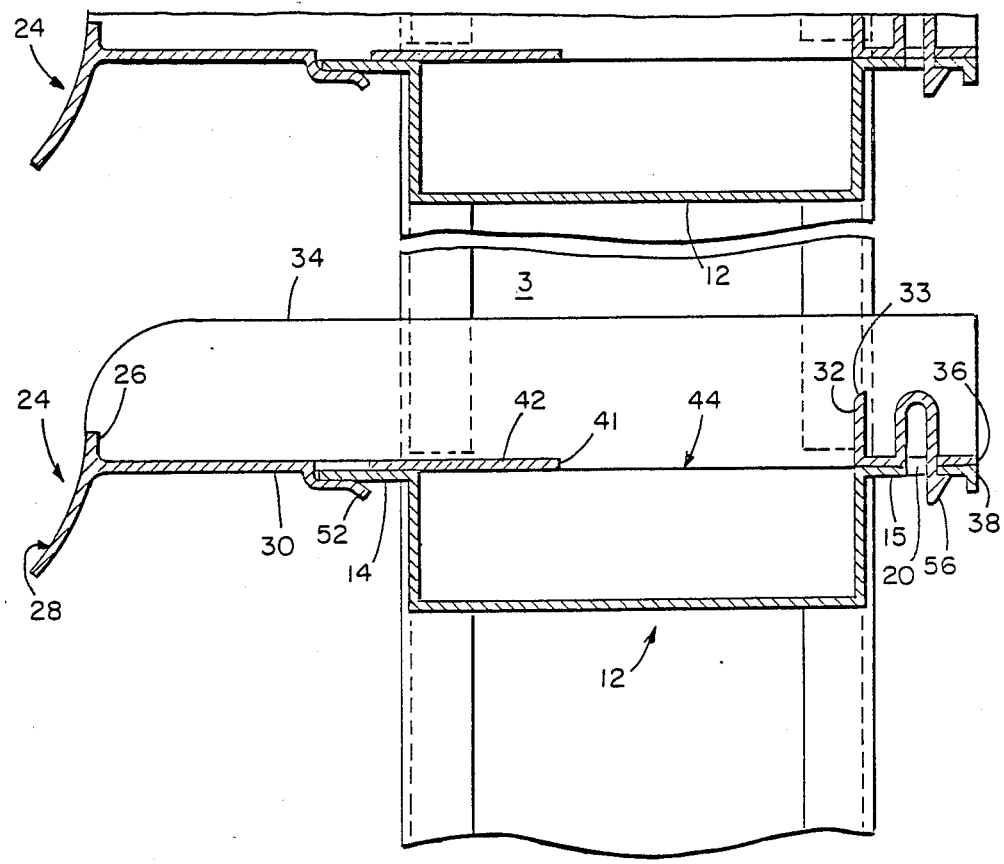
FIG. 5 is a view similar to FIG. 2 with the cartridge removed.

As seen in FIGS. 1 and 5, each support means 12 is in the form of a substantially U-shaped channel member which opens upwardly. It has horizontal flanges 14 and 15 extending side-to-side along the front and the back of the channel member 12 respectively.

In the rear flange 15 of each channel member 12 are a plurality of spaced slots 20 running lengthwise across the entire channel member (only a few of the slots are illustrated in FIG. 1).

Figure 6:
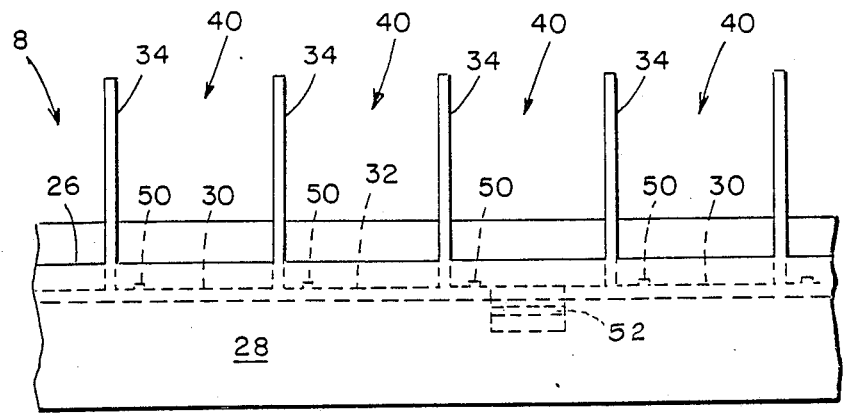
FIG. 6 is a front view partially broken away of the supporting tray.
Figure 7:
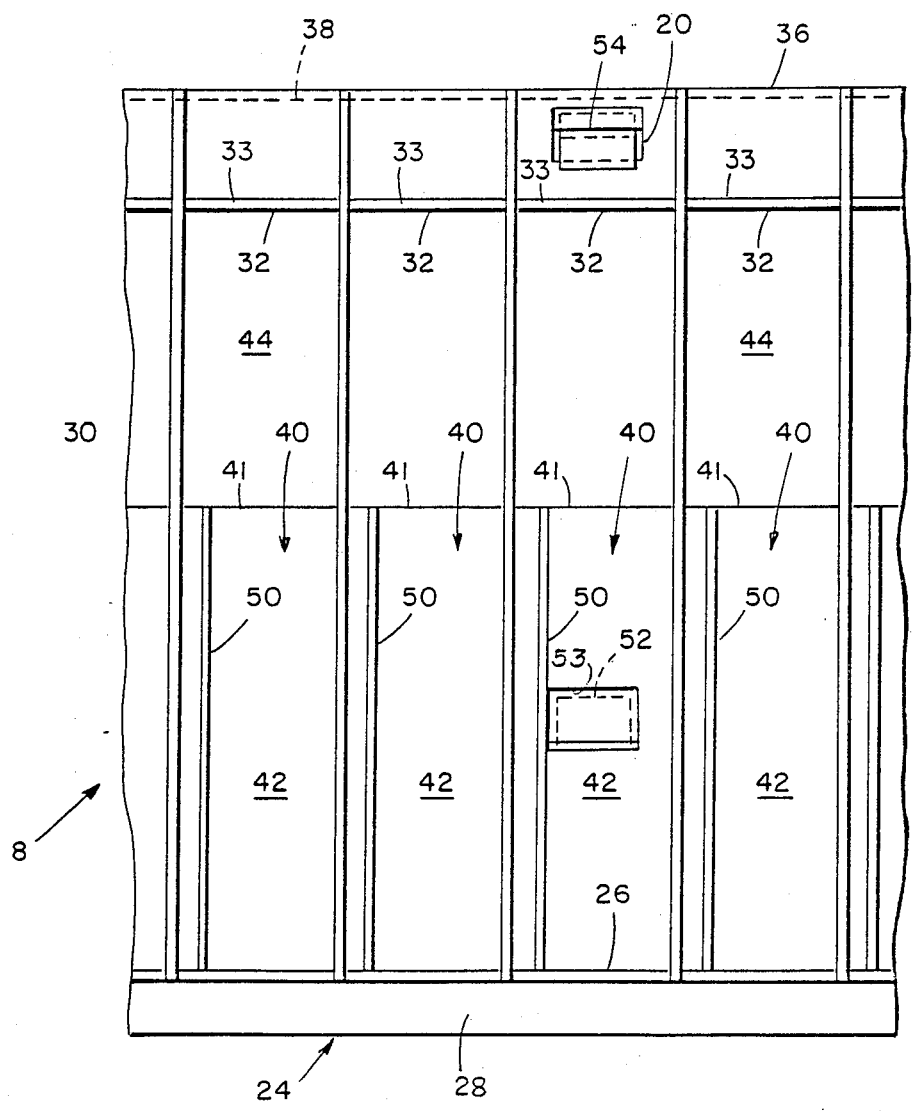
FIG. 7 is a plan view thereof.

The supporting tray 8 will best be described, per se, with reference to FIGS. 5, 6 and 7. The tray includes a front portion 24 having an upstanding lip 26 which is engageable with an article in the tray. A depending arcuate member 28 for receiving identifying indicia extends lengthwise of the tray across its front.

The tray includes a bottom 30 and a rear guide 32 having an arcuate camming or guiding surface 33 for engagement with an article in the tray. Dividers 34 extend upwardly from the bottom of the tray and extend from the front portion 24 to the rear edge 36 where there is formed a downwardly extending lip 38 which adds rigidity of the tray. The dividers 34 separate the tray into a plurality of cells generally designated 40, each divider forming one side wall of a cell.

The bottom 30 of the tray 8 extends rearwardly from the front portion 24 and terminates at a location 41 which is spaced from the rear guide 32 to create a supporting surface 42 contiguous with the front portion 24 and a gap 44 contiguous with the rear guide 32 of each cell. The terminal location 41 of the bottom 30 is closer to the rear guide 32 than to the front portion 24 thereby to make the supporting surface 42 longer than the gap 44.

Compensating means in the form of ribs 50 extend from the front portion 24 of the tray 8 rearwardly of the supporting surface 42. Each rib compensates for an irregularity in the bottom of an article which the tray is designed to hold. The compensating means 50 is illustrative of any raised, extended or depressed portion or the like of the cell 40, which is intended to compensate for a mating surface in the object to be stored and dispensed from the tray.

Spaced laterally along the width of the tray are a plurality of depending spring tabs 52, only one of which is seen in FIGS. 6 and 7 although others would be shown located laterally of the figure if it were not shown or shortened widthwise. The tab 52 is pressed downwardly out of the bottom 30 of the tray leaving a hole 53.

Located widthwise of the tray 8 near the rear edge 36 and beyond the guide 32, are a plurality of U-shaped, spring-clip members each having a tang 56 at its lower edge. Again, only one clip is seen in each figure. The spring clips are engageable in openings 20 in the flanges 15 of the support member 12.

To locate a tray 8 on its supporting means 12, the tab member 52 is slid beneath the front flange 14 of the support 12 while the spring-clip 54 is compressed and inserted into the opening or slot 20 in the rear flange 15 with the tang 56 springing outwardly to engage beneath the flange. Each tray is thus removablly positioned in its supporting means 12.

In storing, a plurality of rectangular objects such as the above described magnetic tape cartridges C, each lies in side-by-side relationship in one of the cells 40 resting on the supporting surface 42. The particular cartridges are not perfectly flat on the bottom, hence the use of the compensating ribs 50.

Figure 2:
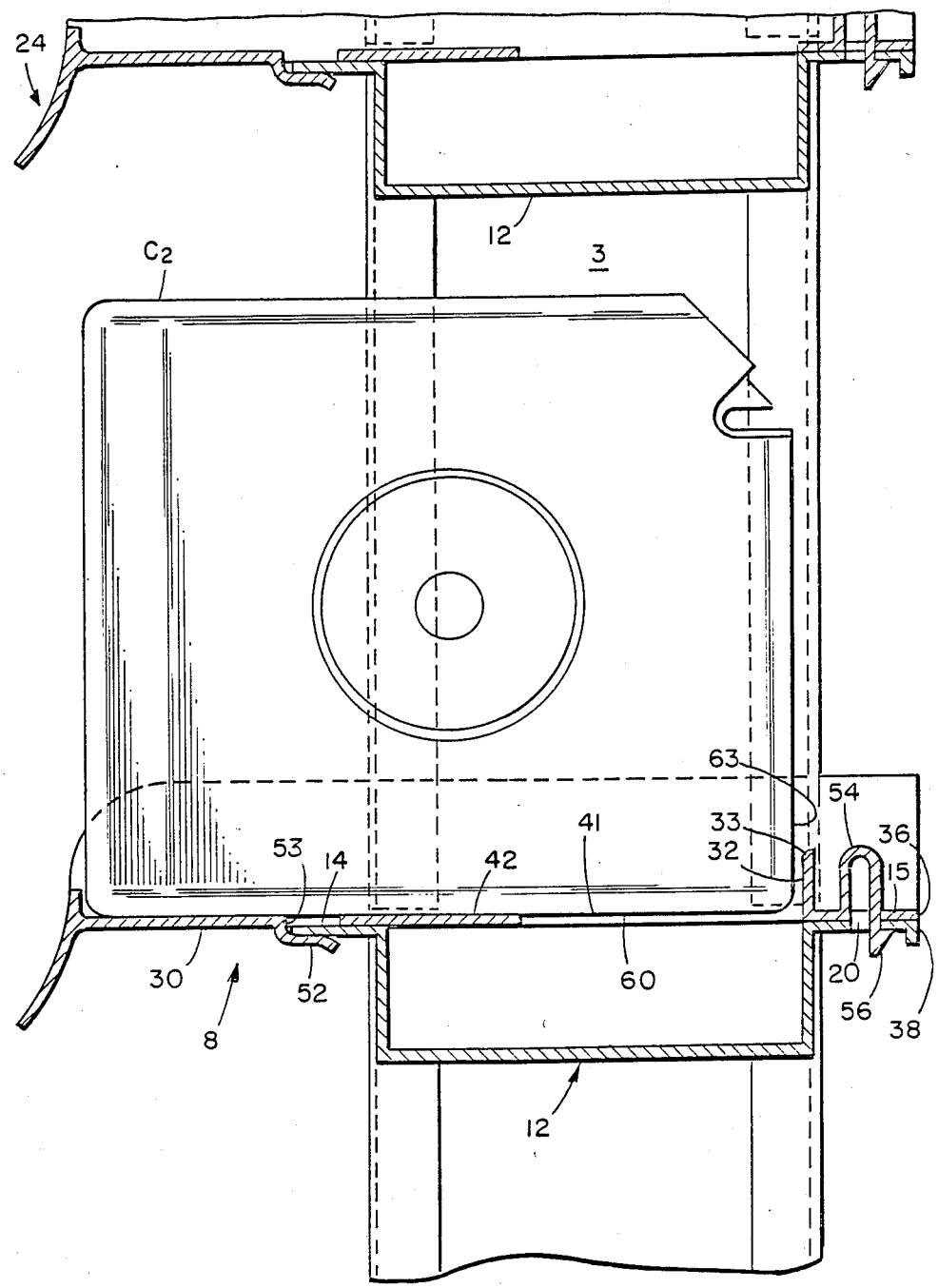
FIG. 2 is a side elevation, partly in section, of the supporting tray with a magnetic tape cartridge in one of its cells.

As seen in FIG. 2, a rear portion 60 (less than half) of each cartridge C overlies the gap 44 in the bottom 30 but since the supporting surface 42 is longer than the gap 44, the cartridge does not automatically fall into the U-shape supporting tray 12 through the gap 44.

Figure 3:
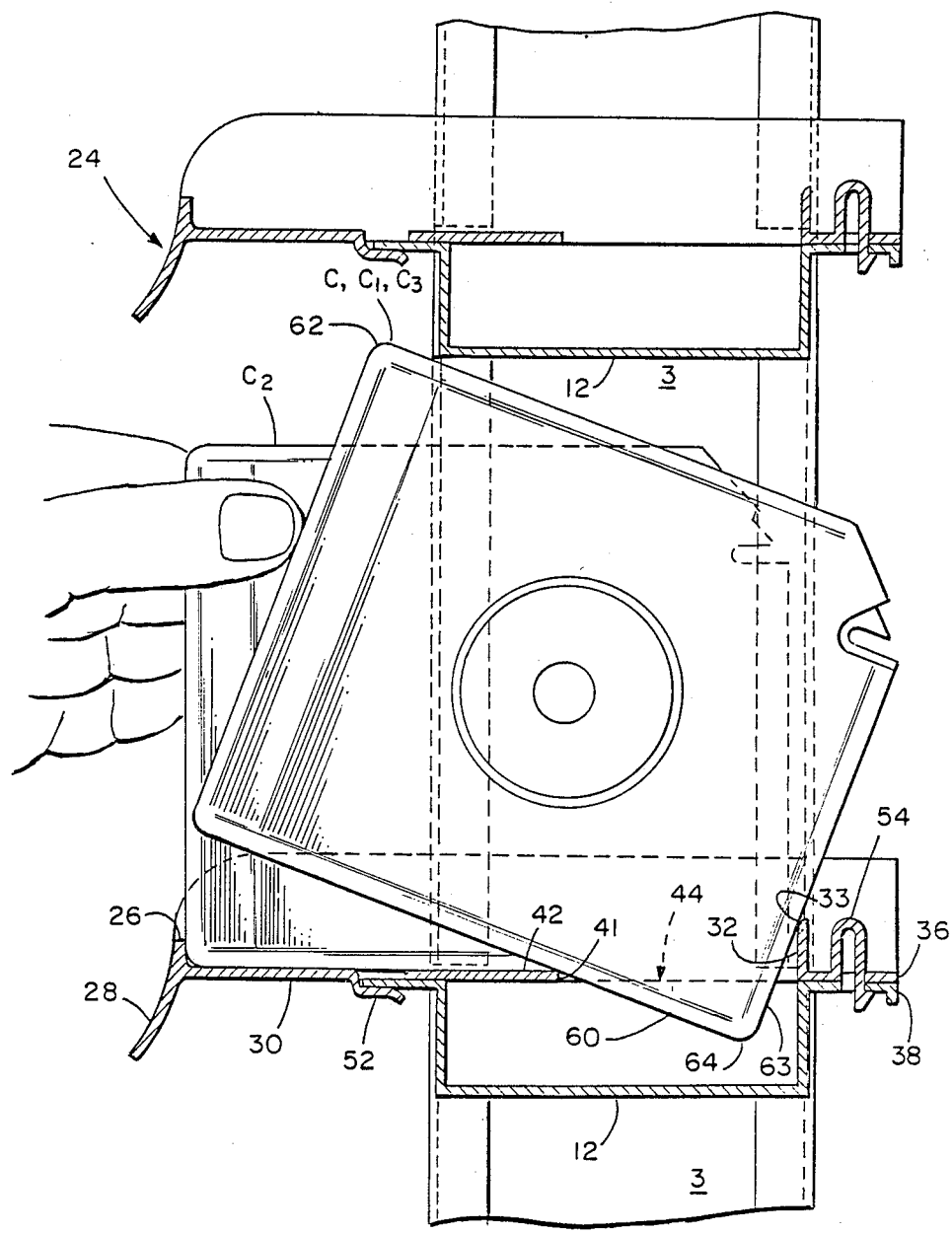
FIG. 3 is a view similar to FIG. 2 with one cartridge being tilted rearwardly and downwardly to better gain access to a cartridge adjacent to it.

To remove a selected cartridge (designated $C_2$ in FIG. 1) the adjacent cartridges $C_1$ and $C_3$ are urged against the guide 32 and are pivoted on the terminal edge 41. They are tilted to the position shown in FIG. 3, as for example, by the thumb and index finger of one hand. Their lower rear edges 63 slide downwardly and are guided by the arcuate camming or guiding surfaces 33 of the guides 32. Their upper front corners 62 then project upwardly until they engage the bottom of the supporting means 12 of the next row above the cartridges. Their lower rear corners 64 are then tilting downwardly through the gap 44 into the interior of the U-shaped supporting channel 12. This permits the desired cartridge $C_2$, which occupies the middle position between $C_1$ and $C_3$, to be gripped by the fingers, i.e., the thumb and index finger and lifted out of its cell 40.

Figure 4:
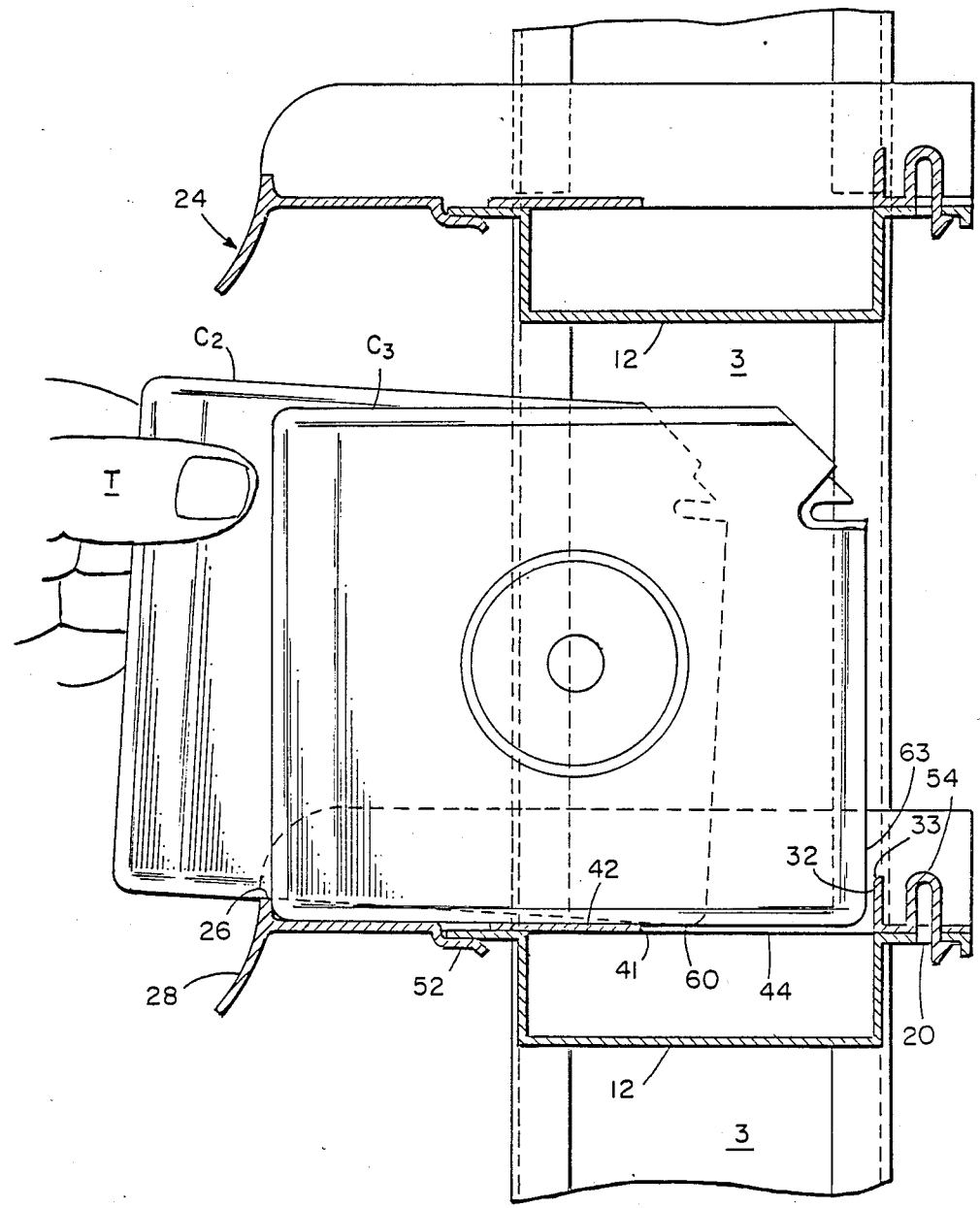
FIG. 4 is a view similar to FIG. 2 showing the cartridge being removed from its cell adjacent a cartridge still in storage position.

Thereafter, as the middle cartridge $C_2$ is being removed, cartridges $C_1$ and $C_3$ tilt, under their own weight, back to the flat storage position as seen in FIG. 4. It will be noted that the thumb T which heretofore had tilted cartridge $C_3$ into the pivoted position is no longer in engagement with the cartridges.

To return a cartridge $C_2$ to its cell 40, it is merely reinserted into the cell in the reverse procedure with or without pivoting the adjacent cartridges.

We claim:

1. A storing and dispensing system for substantially, rectangular objects comprising:
   a plurality of trays, one above another,
   horizontally extending support means beneath each tray,
   the support means being substantially U-shaped, upwardly opening channel members arranged one above another,
   means for releasably securing one tray to each support means,
   each tray having a front portion, a rear guide and a bottom portion,
   dividers projecting upwardly from the bottom portion of the tray to form a plurality of cells,
   the bottom portion extending rearwardly from the front portion and terminating at a location spaced from the rear guide to create a supporting surface contiguous with the front portion and to further create a gap extending between the terminus of the bottom portion and the rear guide of each cell and located above the U-shaped channel member, thereby to permit a corner portion of an object to be located on the supporting surface of a cell to be tilted through the gap and into the U-shaped channel members to gain better access to an object in an adjacent cell.

2. A storing and dispensing system according to claim 1 wherein the terminal location of the bottom portion is closer to the rear guide than to the front portion thereby to make the supporting surface longer than the gap.

3. A storing and dispensing system according to claim 1 having means on the front portion of each cell for accepting identifying indicia.

4. A storing and dispensing system according to claim 1 having means on the supporting surface to compensate for irregularities in objects that engage the supporting surface.

5. A storing and dispensing system according to claim 1 wherein the releasable securing means comprise spring clips on the tray engageable with flanges on the U-shaped channels.

6. A storing and dispensing system according to claim 1 wherein the rear guide has an upstanding arcuate guiding surface arranged to face towards the front portion engageable with the rectangular object to assist in guiding it into the gap.

7. A storing and dispensing system for substantially, rectangular objects comprising:
a plurality of trays, one above another,
horizontally extending support means beneath each tray,
means for releasably securing one tray to each support means,
each tray having a front portion, a rear guide and a bottom portion,
dividers projecting upwardly from the bottom portion of the tray to form a plurality of cells,
the bottom portion extending rearwardly from the front portion and terminating at a location spaced from the rear guide to create a supporting surface contiguous with the front portion and to further create a gap extending between the terminus of the bottom portion and the rear guide of each cell,
said support means being provided with a recess located below and substantially coextensive with said gap,
thereby to permit a corner portion of an object to be located on the supporting surface of a cell to be tilted through the gap and into the recess of said support means to gain better access to an object in an adjacent cell.

8. A storing and dispensing system according to claim 7 wherein the terminal location of the bottom portion is closer to the rear guide than to the front portion thereby to make the supporting surface longer than the gap.

9. A storing and dispensing system according to claim 7 having means on the front portion of each cell for accepting identifying indicia.

10. A storing and dispensing system according to claim 7 having means on the supporting surface to compensate for irregularities in objects that engage the supporting surface.

11. A storing and dispensing system according to claim 7 wherein the releasable securing means comprises spring clips on he tray, and the support means are provided with cooperating means arranged to engage and retain said spring clips.

12. A storing and dispensing system according to claim 7 wherein the rear guide has an upstanding arcuate guiding surface arranged to face towards the front portion engageable with the rectangular object to assist in guiding it into the gap.

* * * * *